United States Patent [19]

Kanda

[11] 4,244,639

[45] Jan. 13, 1981

[54] LENS SIZING DEVICE

[76] Inventor: Masami Kanda, 7475 Dakin St., Denver, Colo. 80221

[21] Appl. No.: 965,900

[22] Filed: Dec. 4, 1978

[51] Int. Cl.$^3$ .............................................. A61B 3/10
[52] U.S. Cl. .......................................... 351/5; 33/200
[58] Field of Search ............................... 351/5; 33/200

[56] References Cited

U.S. PATENT DOCUMENTS 1,052,161   6/1911   Mayerle ................................. 351/5

Primary Examiner—John K. Corbin
Assistant Examiner—Rodney B. Bovernick

Attorney, Agent, or Firm—Young & Martin

[57] ABSTRACT

An improved measuring rule for measuring the pupillary distance between a person's eyes is provided wherein a disc is both rotatably and slidably supported on an index rule, the disc being similarly indexed. By positioning the disc over the pupil of an eye while the person is wearing a pair of lens-receiving frames, the disc provides measurement of the required lens blank size necessary for those frames simultaneously with the measurement of the pupillary distance. The disc also facilitates the measurement for a bifocal lens and also indicates any required vertical height adjustment caused by an optical abnormality.

18 Claims, 9 Drawing Figures

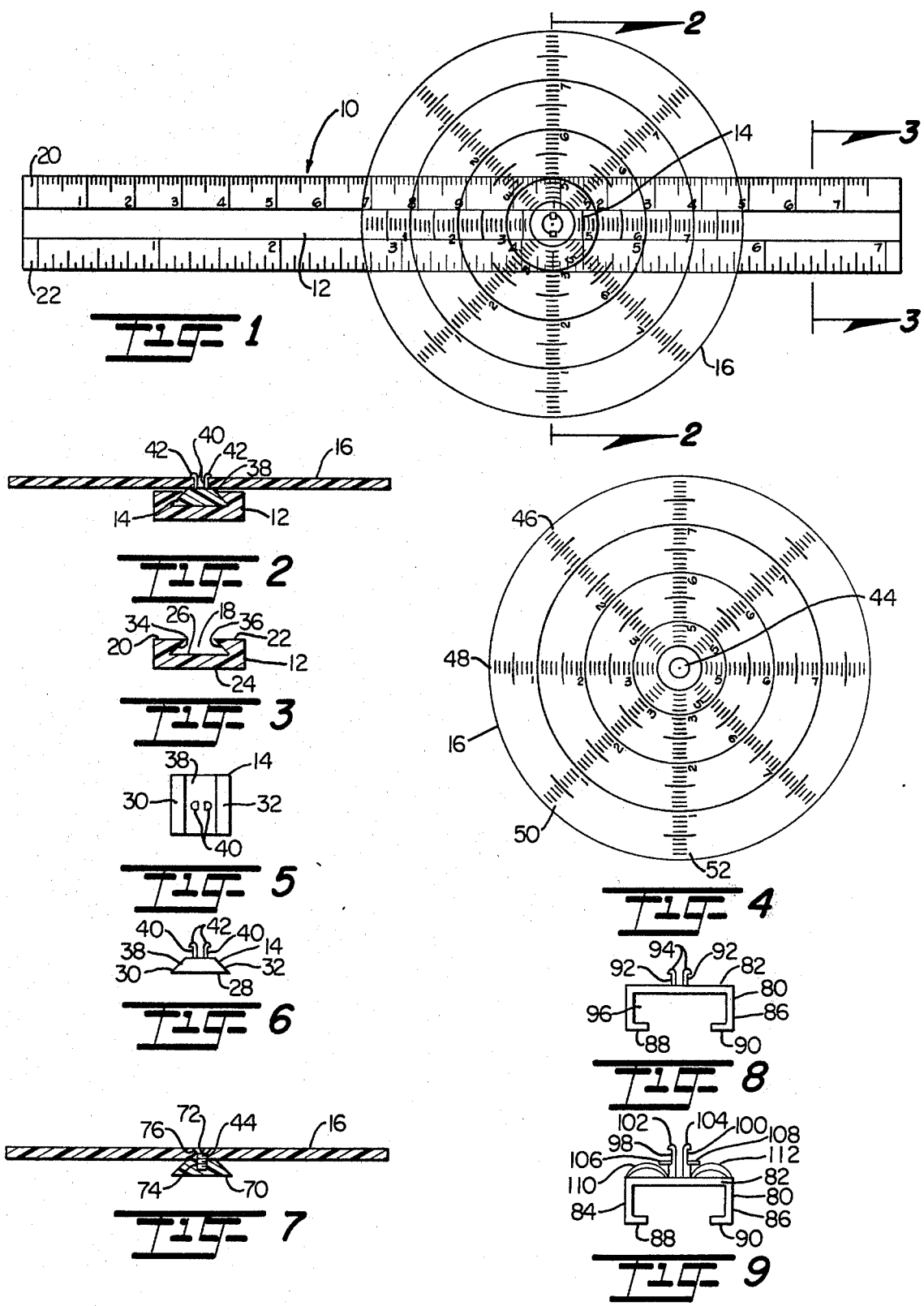

LENS SIZING DEVICE

BACKGROUND OF THE INVENTION

In measuring a person's eyes for purposes of corrective lenses, a number of measurements must be taken. For purposes of taking such measurements, numerous specialized apparatus have been developed, and the various apparatus are often quite expensive. As a result, the length of time required for examination is necessarily increased when the examiner is forced to keep switching between measurement instruments. Therefore, an instrument which can perform several functions in a novel manner is desirable both from a capital investment point of view and from a time savings standpoint.

One particular area of concern in eye measurement is that of the lens blank size necessary for mounting in a selected frame, which lens blank is capable of being ground to a prescription correcting the patient's eyesight. The reason for this concern is that as the diameter of a lens blank is increased, the cost of the same likewise increases. This situation is further complicated where the pupil of a patient's eye is not necessarily centered in the frame. A simple measurement of the diameter of the frame opening is not sufficient to yield the lens blank size because the optical center, at the center of a circular lens, must be positioned directly in front of the pupil of the eye. Hence, if the pupil is offset from the center of the frame opening, so must the optical center of the lens blank be positioned away from the center of the frame opening. Therefore, the lens blank necessary to fill the entire frame opening while maintaining its optical center in this offset relation must be quite a bit larger than the dimensions of the frame opening itself. This situation can lead to errors in calculation of the lens blank size which in turn can cause the eye examiner to estimate the cost of the lens incorrectly to the patient.

SUMMARY OF THE INVENTION

It is an object of the present invention to provide a novel device capable of measuring several parameters necessary in determining corrective lenses for a person's eyesight.

Another object of the present invention is to provide a novel device which can measure both the pupillary distance between a person's eyes as well as the size of a lens blank necessary to provide a corrective lens for a selected eyeglass frame.

It is a further object of the present invention to provide an apparatus wherein a first measurement instrument may be held in fixed relation to a person's eyes while a second measurement instrument may be slidably positioned at any point along the first instrument.

Yet another object of the present invention is to provide an elongated strip having a set of indexed markings and a slidable disc mounted on the strip in a rotatable manner with second index markings thereon whereby various eye measurement parameters may be achieved and which measurement may facilitate calculation of those parameters while helping to avoid mistakes in such calculation.

It is a further object to provide means for enhancing the readability of the index markings on a pupillary distance rule while providing a second measurement apparatus on that rule which facilitates the measurement of the lens blank size necessary for a selected eyeglass frame.

Still another object of the present invention is to provide a novel device which accomplishes the above-described objects and, in addition, facilitates measurement both of bifocal lens parameters and parameters necessary to correct abnormalities in the position of a person's eyes with respect to eyeglass frames.

The preferred form of the present invention comprises three basic elements: an indexed rule, an indexed disc, and a slidable support such as a slide bracket. The indexed disc is rotatably mounted on the slidable bracket, and this bracket may slide from one end of the rule to the other, preferably by means of a channel assembly. While the preferred embodiment includes this feature of having the disc mounted on a slidable support for purpose of convenience, it is only necessary that the disc be rotatable on the rule. In either case, the disc is transparent, as is the rule, and the center of the disc is positionable over the pupil of a patient's eye. Whereas the rule provides a measurement of the pupillary distance between the pupils of a patient's eye, when the device is used while the patient is wearing a selected frame for the lenses, the size of lens blank necessary for those frames may be determined by positioning the center of the transparent disc over the pupil of the eye and measuring the maximum reading on the disc thereby indicating the diameter of the necessary lens.

By turning the disc so that one of its scales is vertical, the distance between the bottom of the frame opening and the lower eyelid of the patient can be taken to provide the necessary height parameter for the corrective bifocal lens. Further, both the vertical and horizontal insets for the pupil with respect to the frame can be measured to establish the correct position of the optical center of the lens blank so as to correct any abnormality in the positioning of a person's eye.

The foregoing and other objects, features and advantages of the present invention will be more readily apparent in view of the following detailed description of the exemplary preferred embodiments.

BRIEF DESCRIPTION OF THE DRAWINGS

FIG. 1 is a top plan view of a pupillary distance measuring tool including the preferred embodiment of the present invention.

FIG. 2 is a cross-section taken about lines 2—2 of FIG. 1.

FIG. 3 is a cross-section taken on lines 3—3 of FIG. 1.

FIG. 4 is a top plan view of the measurement disc according to the present invention.

FIG. 5 is a top plan view of the slide bracket according to the present invention.

FIG. 6 is a side view in elevation of the slide brackets shown in FIG. 5.

FIG. 7 is a cross-sectional view of an alternative embodiment of the slide bracket with the measurement disc attached thereto.

FIG. 8 is a side elevational view of a second alternative embodiment of the slide bracket; and FIG. 9 is a side elevational view of a third embodiment of the slide bracket according to the present invention.

DETAILED DESCRIPTION OF THE PREFERRED EMBODIMENT

The measuring device of the present invention is constructed to facilitate the combined measurement of the pupillary distance between a person's eyes and simultaneously the lens blank size required for a selected pair of lens frames prior to grinding of the individual's corrective prescription for eyesight by the ground lens. This dual function is accomplished by apparatus having three essential parts: A measurement rule 12, a measurement disc 16, and a support member 14 therebetween which permits both slidable and rotational movement of the disc with respect to the ruler.

The above three elements of the present invention may best be seen in FIGS. 1–6. FIG. 1 shows the three elements in assembled fashion wherein the completed tool, or pupillary distance measuring tool 10, is shown as comprised of a ruler 12 having a channel 18 in which the support member or bracket 14 is slidably mounted. Measurement disc 16 is rotatably mounted on slide bracket 14 so that it may be rotated about its major axis. This rotation may be undertaken independently of the sliding of slide bracket 14 from one end of ruler 12 to the other.

FIG. 3 shows the construction of ruler 12 in the preferred embodiment. As may be seen, ruler 12 has a general rectangular cross-section, and has a channel 18 cut along a longitudinal face so as to divide that face into face portions 20 and 22. The opposite face 24 is substantially flat in the preferred embodiment. Channel 18 has a dove-tailed or wedge-shaped configuration wherein the bottom 26 of the channel is wider than the separation distance of face portions 20 and 22.

FIGS. 5 and 6 show the slide bracket 14 which is formed to be slidably inserted within channel 18 of ruler 12. Slide bracket 14 has a dove-tailed or rearwardly convergent configuration in the preferred embodiment and has a substantially flat face 28 which is of substantially the same width as bottom 26 of channel 18. Similarly, rearwardly convergent sides 30 and 32 of slide bracket 14 converge from the end surface 28 toward the disc 16 to conform to the configuration of sides 34 and 36 of channel 18 formed in ruler 12. An upper face 38 is formed substantially parallel with face 28 and a pair of mounting nubs 40 are formed on face 38. Nubs 40 are formed of a resilient material such as a rubber or plastic and are in closely-spaced relation to one another. Further, nubs 40 each terminate at the upper end in an outwardly disposed shoulder 42. As may be seen in FIG. 2, measurement disc 16 is mounted on slide bracket 14 by means of nubs 40, and is retained on slide bracket 14 by means of shoulders 42. This construction provides a snap-lock attachment since nubs 40 are made of a resilient material. Hence, measurement disc 16 may be mounted on slide bracket 14 by forcing nubs 40 together and snapping measurement disc 16 into place. Since slide bracket 14 is slightly thicker than the depth of channel 18, face 38 is slightly above faces 20 and 22 so that face 38 is in closely-spaced parallel relation to faces 20 and 22.

By the above construction, measurement disc 16 is rotatable about nubs 40, but nubs 40 exert a frictional force to hold measurement disc 16 in place when no rotation force is supplied. Similarly, the frictional force between slide bracket 14 and channel 18 will retain slide brackets 14 in its position unless a sliding force is supplied to move the brackets from one end of the ruler 12 to the other.

Measurement disc 16 is best shown in FIG. 4. In the preferred embodiment, measurement disc 16 is approximately 8 centimeters in diameter and is formed of a transparent material such as a resilient plastic. Measurement disc 16 has a bore 44 through its center, and the width of this bore is selected to conform to the spacing of nubs 40 on slide bracket 14. Further, the thickness of measurement disc 16 as shown in FIG. 2 should be the same as the distance between face 38 of slide bracket 14 and shoulders 42 of nubs 40. Since it is desirable that measurement disc 16 rotate about an axis which passes perpendicularly through the central longitudinal axis of ruler 12, nubs 42 should be oriented centrally on slide bracket 14 so that when slide bracket 14 is inserted into channel 18, nubs 40 are in closely-spaced relation to this axis. When the measurement disc 16 is then mounted on slide bracket 14, the perpendicular axis will pass through the center of measurement disc 16.

For use of the apparatus as a measurement tool, it is essential that ruler 12 and measurement disc 16 be provided with rulings or markings indicative of distance. As shown in FIG. 1, ruler 12 is provided with both metric and English rulings on opposite edges, and these rulings or markings are placed respectively on faces 20 and 22 of ruler 12. These rulings facilitate the measurement of the pupillary distance between an individual's eyes when the ruler is oriented horizontally at a position corresponding to the bridge of a person's nose. The markings on ruler 12 also facilitate other measurements such as bridge size or any meridian associated with eye measurement.

As is shown in FIG. 1, but with greater clarity in FIG. 4, measurement disc 16 is provided with metric rulings on diametric ends. Specifically, four diametric bands, 46, 48, 50 and 52 are shown in FIG. 4 as constituting the preferred embodiment. It is noted that the rulings are consecutively indexed from one edge of measurement disc 16 to the other edge, but the index markings could be formed radially as well. By indexing the discs diametrically from one edge to the other, the lens blank size may be conveniently determined for a frame opening. With the center of the disc positioned over the pupil of the eye, the disc is rotated to give the maximum distance the frame opening extends from the center of the disc. The lens blank is then obtained by subtracting from the reading the amount equal to the difference between the disc's diameter and the reading. For example, if the reading of maximum distance is 72 millimeters on the disc, and the disc is 80 millimeters in diameter, the lens blank must be 72−(80−72) or 72−8=64 mm.

Another convenient way of providing measurement of lens blank size is to have indexing radially with each millimeter would be labeled as twice the amount. In this manner, 10 millimeters would be labeled 20 and 20 millimeters 40. By indexing the device in this manner, the measurement of the furthest extension of the frame from the pupil would automatically give the blank size since the doubling would be automatically provided. The reason for this is that blank sizes are measured in diameter whereas the maximum extension of the frame from the pupil is a measurement of the radius of the blank so that doubling of the radius is necessary to provide the corresponding diameter.

In operation, the device may be used to measure the distance between the pupils of an individual's eyes by orienting ruler 12 horizontally on the bridge of the patient's nose. Where the patient has selected a pair of frames for his or her lenses, this measurement may be undertaken while the patient is wearing the frames. In such a case, the eye examiner can position the rule horizontally across the patient's pupils. Then, by moving the disc so that its center is positioned over the pupil of the eye, so as to represent the optical center of a lens blank to be ground for the patient's prescription, the minimum diameter of the blank can be determined by measuring the maximum distance of the frame opening from the center of the disc by rotating the disc and noting the maximum reading on the indexed markings. Similarly, the disc may then be slid to the opposite end and positioned over the pupil of the other eye and the procedure repeated. By determining the dimensions of the lens frame, the size of lens blanks which must be selected for grinding can then be calculated as is known in the art.

The present invention further facilitates these dimensional measurements necessary for the calculations since the diametric bands are at 45° intervals so that bands 46 and 50 as well as bands 48 and 52, respectively, are perpendicular to one another. Hence, if band 48 is aligned horizontally so as to obtain the width of the lens frame, then band 52 will allow measurement of the height of the lens frame without the need for further rotation of measurement disc 16. It is further noted that by constructing measurement disc 16 of transparent material, the markings or rulings on ruler 12 may be viewed even though the rulings on ruler 12 are behind measurement disc 16.

For determining the placement of a bifocal lens, one set of index markings may be oriented vertically and the distance between the bottom of the frame and the eyelid may be noted as is well-known in the art. Measurement may also be made of the distance of the pupil from both the bottom and the side of the frame opening for each pupil so that any abnormalities connected with eye positioning may be corrected.

FIGS. 7–9 show alternative embodiments to the slide bracket 14 shown in FIGS. 1, 2, 5 and 6. The first alternative embodiment, shown in FIG. 7, is quite similar to slide bracket 14. In FIG. 7, slide bracket 70 is adapted to fit dovetail channel 18 of ruler 12. Slide bracket 70 differs from slide bracket 14 in that slide bracket 70 does not have nubs 40 nor shoulders 42 as does slide bracket 14. Mounting of measurement disc 16 is accomplished in FIG. 7 by means of a screw 72 which is threaded into bore 74 provided in slide bracket 70. It is helpful in this embodiment that bore 44 of disc 16 be tapered to form countersunk portions 76 to receive the head of screw 72. Further, by selecting the depth of bore 74 to conform to the difference between the thickness of measurement disc 16 and the length of screw 72, the amount of frictional force exerted by screw 72 and slide bracket 70 on measurement disc 16 may be adjusted for convenient frictional rotation of measurement disc 16.

FIG. 8 shows a second embodiment of a slide bracket of the present invention. Here, slide bracket 80 has a flat portion 82 and a pair of downwardly projecting arms 84 and 86 which terminate in inwardly projecting shoulders 88 and 90, respectively. Flat portion 82 has a pair of nubs 92 projecting upwardly, and each of nubs 92 terminate in shoulders 94. Nubs 92 are centrally located on flat portion 82 in closely spaced relation to one another and function in the same manner as nubs 40 and shoulders 42 described with reference to the slide bracket 14.

As may readily be appreciated, slide bracket 80 is constructed for receiving ruler 12, so that slide bracket 80 has a channel 96 of general rectangular cross-section formed of flat portion 82, arms 84 and 86 and shoulders 88 and 90. Whereas, in the preferred embodiment, the ruler 12 receives the slide bracket, in this alternative embodiment the slide bracket receives the ruler. For this reason, slide bracket 80 should be formed of a transparent material so that the index markings or rulings on ruler 12 may be observed therethrough. Further, since slide bracket 80 receives ruler 12, ruler 12 may be formed of solid material rather than having a channel, such as channel 18, cut into one of its surfaces.

Finally, FIG. 9 shows a slide bracket 80 with some further modifications to constitute a third embodiment of the slide bracket of the present invention. In this case, however, modified nubs 98 and 100 are provided each of which terminate in shoulders 102 and 104, respectively. Nubs 98 and 100 are larger than nubs 92 shown in FIG. 8 and are provided at a midportion with arms 106 and 108, respectively. This configuration is provided so that measurement disc 16 may be mounted between arms 106, 108 and shoulders 102, 104. A pair of lenses 110 and 112 are also attached to flat portion 82 adjacent nubs 102 and 104 and perform two functions. First, lenses 110 and 112 cooperate with shoulders 102, 104 and arms 106, 108 in positionally retaining measuring disc 16. Second, since slide bracket 80 is formed of a transparent material, lenses 110 and 112 magnify the rulings on ruler 12, specifically along the edges of ruler 12 so as to enhance visual perception thereof. Lenses 110, 112 can be formed as circular convex lenses, or may be formed as a rectangular lens having a projecting convex surface.

Although the present invention has been described in detail relative to the description of the exemplary preferred embodiment, various changes, modifications and additions other than those specifically mentioned herein will be readily apparent to those having normal skill in the art without departing from the spirit of this invention.

I claim:

1. A device for measuring parameters for corrective lenses for a person's eyes, comprising:
    a transparent elongated strip having a first face with first index markings thereon; and
    a transparent disc slidably mounted on said strip by a substantially transparent mounting means and rotatable about an axis perpendicular to the plane of said strip, said disc having second index markings thereon, the axis of said disc intersecting said strip and said disc sized to extend laterally on either side of said strip.

2. A device according to claim 1 wherein said second index markings include a plurality of equally spaced parallel arcs of concentric circles, said arcs arranged along a radius of said disc.

3. A device according to claim 1 wherein said second index markings are a diametric band of concentric arcs indexed consecutively across said band.

4. A device according to claim 1 wherein said disc is rotatably mounted on a slidable support, and said support is slidably mounted on said strip.

5. A device according to claim 4 wherein said slidable support is a slide bracket having a flat transparent surface parallel to said face of said strip with a pair of arms extending in a perpendicular direction therefrom, said arms each terminating in a lip projecting inwardly from said arms along a second face of said strip opposite said first space when said slide bracket is mounted on said strip.

6. A device according to claim 4 wherein said disc has a center hole therethrough and said support has an upstanding member terminating in a nub, said disc being resiliently retained by said member and said nub for rotation thereon.

7. A device according to claim 6 wherein said support further includes a magnifying lens secured to said transparent surface and said upstanding member includes retaining means for retaining said disc in spaced relation to said transparent surface, said lens positioned between said transparent surface and said disc.

8. A device according to claim 1 wherein said strip has a longitudinal channel of wedge-shaped cross-section and includes a slide member configured for insertion in said channel, said slide member including mounting means for rotatably mounting said disc on said slide member.

9. A device according to claim 8, said mounting means being a screw.

10. A device according to claim 8 wherein said mounting means is defined by a pair of spaced-apart upstanding members each terminating in a shoulder, said upstanding members being constructed of resilient material for yieldingly retaining said disc on said slide member.

11. A device according to claim 8 wherein said slide member has a portion protruding from said channel and defining a flat surface in substantially parallel spaced-apart relation to said first face.

12. A device according to claim 7 wherein said lens is a rectangular convex lens, said lens being positioned to positively support said disc.

13. A pupillary distance measuring tool comprising:

an elongated transparent rectangular strip having an indexed face;

a substantially transparent slideable mounting means associated with said strip for mounting said disc to said strip in spaced-apart parallel relation to the plane of said strip; said disc being mounted for rotation about a central axis perpendicular to said indexed face, said central axis intersecting said strip and said mounting means slideable along the longitudinal axis of said face.

14. A tool according to claim 13 wherein said strip includes a longitudinal channel, said mounting means including a slide bracket slideably retained in said channel, said disc being rotatably secured to said slide bracket and sized to extend laterally on either side of the edges of said strip.

15. A tool according to claim 13, wherein said mounting means includes a transparent bracket having lateral lips projecting first downwardly along the lateral edges of said strip and then inwardly across a face of said strip opposite said indexed face, said transparent bracket further including a mounting post for rotatably retaining said disc thereon.

16. A tool according to claim 15, further including a lens associated with one of said strip and said bracket and positioned above said indexed face for magnifying a portion of said indexed face.

17. A tool according to claim 16, wherein said lens is a circular convex lens mounted on said bracket.

18. A tool according to claim 13 wherein said disc is indexed radially outward from the center of said disc.

* * * * *